US012019090B2

(12) United States Patent
Garcia et al.

(10) Patent No.: US 12,019,090 B2
(45) Date of Patent: Jun. 25, 2024

(54) AUTOMATIC DETERMINATION OF THE MEASUREMENT RATE FOR THE CAPTURING OF A PROCESS VARIABLE

(71) Applicant: VEGA Grieshaber KG, Wolfach (DE)

(72) Inventors: Juan Garcia, Biberach (DE); Ralf Hoell, Titisee-Neustadt (DE)

(73) Assignee: VEGA Grieshaber KG, Wolfach (DE)

( * ) Notice: Subject to any disclaimer, the term of this patent is extended or adjusted under 35 U.S.C. 154(b) by 128 days.

(21) Appl. No.: 17/601,728

(22) PCT Filed: Apr. 6, 2020

(86) PCT No.: PCT/EP2020/059780
§ 371 (c)(1),
(2) Date: Oct. 6, 2021

(87) PCT Pub. No.: WO2020/212185
PCT Pub. Date: Oct. 22, 2020

(65) Prior Publication Data
US 2022/0206034 A1  Jun. 30, 2022

(30) Foreign Application Priority Data
Apr. 16, 2019  (DE) .................... 10 2019 205 516.8

(51) Int. Cl.
*G01P 13/00* (2006.01)
*G01D 21/02* (2006.01)
(Continued)

(52) U.S. Cl.
CPC .............. *G01P 13/00* (2013.01); *G01D 21/02* (2013.01); *G01P 1/02* (2013.01); *G01S 19/01* (2013.01);
(Continued)

(58) Field of Classification Search
CPC ... G01P 13/00; G01P 1/02; G01P 1/06; G01D 21/02; G01D 21/00; G01S 19/01;
(Continued)

(56) References Cited

U.S. PATENT DOCUMENTS 8,606,378 B2 * 12/2013 Zornio ............... G05B 19/0425
700/20
9,454,744 B2 * 9/2016 Imming .................. H04W 4/33
(Continued)

FOREIGN PATENT DOCUMENTS

CN  101743159 A  6/2010
CN  103376129 A  10/2013
(Continued)

OTHER PUBLICATIONS

Combined Chinese Office Action and Search Report dated Jul. 27, 2022 in Chinese Patent Application No. 202080036807.4, 7 pages.
(Continued)

*Primary Examiner* — Lisa M Caputo
*Assistant Examiner* — Eric Sebastian Von Wald
(74) *Attorney, Agent, or Firm* — Oblon, McClelland, Maier & Neustadt, L.L.P.

(57) ABSTRACT

A field device for determining a process variable is provided, the field device including: a sensor circuitry configured to sense a measured value of the process variable; a communication circuitry configured to transmit the measured value wirelessly to a receiver; a position determination circuitry configured to determine a geographic position of the field device; and a control circuitry configured to determine, as a function of a current geographical position of the field device, at least one of: (a) a current measurement rate at which the sensor circuitry acquires measured values of the process variable, and (b) a current data transmission rate at which the communication circuitry transmits measured val-
(Continued)

ues to the receiver. A method of operating a field device is also provided.

14 Claims, 3 Drawing Sheets

(51) Int. Cl.
    *G01P 1/02*     (2006.01)
    *G01S 19/01*     (2010.01)
    *G05B 19/418*     (2006.01)

(52) U.S. Cl.
    CPC .............. *G05B 19/4183* (2013.01); *G05B 2219/31001* (2013.01)

(58) Field of Classification Search
    CPC ... G01S 19/03; G01S 19/39; G01N 2001/021; G05B 19/4183; G05B 2219/31001; G05B 2219/25428; G05B 2219/25062; G05B 2219/31131; G05B 2219/33331; G05B 2219/31211; G05B 2219/37147; H04M 2250/10; H04M 2250/12; H04W 28/0221; H04B 1/1615; H03K 19/0008; H03H 2017/0245
    See application file for complete search history.

(56) References Cited

U.S. PATENT DOCUMENTS

| | | | |
|---|---|---|---|
| 10,175,301 B1* | 1/2019 | Brubacher | G01R 31/385 |
| 11,531,381 B2* | 12/2022 | Law | H04W 76/10 |
| 2006/0290328 A1* | 12/2006 | Orth | G05B 19/4185 |
| | | | 323/218 |
| 2007/0244571 A1* | 10/2007 | Wilson | G05B 19/042 |
| | | | 707/E17.005 |
| 2008/0274766 A1* | 11/2008 | Pratt | H04W 56/0015 |
| | | | 455/552.1 |
| 2009/0001226 A1 | 1/2009 | Haygood | |
| 2010/0274528 A1* | 10/2010 | Lecuyer | G05B 23/0221 |
| | | | 702/183 |
| 2012/0076007 A1 | 3/2012 | Nelson | |
| 2013/0275572 A1 | 10/2013 | Schaetzle et al. | |
| 2015/0287318 A1 | 10/2015 | Nair et al. | |
| 2016/0116324 A1 | 4/2016 | Job et al. | |
| 2016/0147205 A1* | 5/2016 | Kaufman | G05B 19/4183 |
| | | | 700/44 |
| 2017/0160727 A1* | 6/2017 | Ishikawa | G05B 19/4184 |
| 2017/0199101 A1 | 7/2017 | Franchitti | |
| 2020/0132533 A1 | 4/2020 | Welle et al. | |

FOREIGN PATENT DOCUMENTS

| | | |
|---|---|---|
| DE | 10 2007 061 239 B4 | 1/2017 |
| EP | 3 282 231 A1 | 2/2018 |
| EP | 3 644 025 A1 | 4/2020 |

OTHER PUBLICATIONS

International Preliminary Report on Patentability and Written Opinion dated Oct. 28, 2021 in PCT/EP2020/059780, (with English Translation), 16 pages.
German Office Action dated Dec. 11. 2019 in German Patent Application No. 10 2019 205 516.8, 7 pages.
International Search Report dated Jul. 15, 2020 in PCT/EP2020/059780 filed on Apr. 6, 2020, 2 pages.

\* cited by examiner

AUTOMATIC DETERMINATION OF THE MEASUREMENT RATE FOR THE CAPTURING OF A PROCESS VARIABLE

REFERENCE TO RELATED APPLICATIONS

This application claims priority to German Patent Application No. 10 2019 205 516.8, filed Apr. 16, 2019, which is incorporated herein by reference in its entirety.

TECHNICAL FIELD

The invention relates to a field device for detecting a process variable and/or measuring a measured value of a process variable in the field of process automation, factory automation and/or the process industry. Furthermore, the invention relates to a method for operating such a field device.

TECHNICAL BACKGROUND

Modern field devices in process automation, factory automation and/or the process industry are increasingly networked and can communicate with each other on the one hand and with higher-level receivers and/or systems on the other. For example, recorded measurement data, measured values, parameterization data and/or diagnostic data of the field devices can be transmitted to corresponding receivers, receiving devices, systems and/or gateways via wireless communication paths, such as Bluetooth, WLAN, LoRa, LPWAN, GSM, GPRS, UMTS, LTE or the like. In principle, communication is divided into two different areas, namely the long-distance area and the short-distance area.

Wireless communication in the long-distance range usually takes place when the field device with radio support is located in the range of corresponding radio cells. The actual communication in the long-distance range can take place here, for example, via a mobile network (e.g. GSM, GPRS, UMTS, LTE, 5G or future standards or the like) and/or via an Internet connection. Data can be transmitted over almost any distance via such communication paths and/or communication networks.

In contrast, wireless communication in the close-range range usually takes place using radio-based communication links, such as a Bluetooth or Bluetooth LE ("Low Energy", LE) connection. For example, when a receiver, such as a mobile wireless operator device (e.g., a smartphone, tablet, laptop, or the like), approaches a field device with a wireless radio interface, data can be exchanged with the operator device via the field device's radio interface. Typical distances over which data is transmitted wirelessly in the short-range range can be approximately in a range of 25 m to 50 m.

SUMMARY

Embodiments of the invention may advantageously provide an improved field device. In the context of the present disclosure, the field device may be a measuring device and/or a sensor for sensing a process variable.

This is made possible in particular by the objects of the independent patent claims. Further embodiments of the invention result from the subclaims and the following description.

A first aspect of the present disclosure relates to a field device for determining a process variable, such as in the field of process automation, factory automation, and/or the process industry. The field device comprises a sensor circuitry (also referred to as sensor unit or sensor) configured to detect, determine, measure, and/or ascertain a measured value of the process variable. Further, the field device comprises a communication circuitry (also referred to as communication unit) that is configured to transmit, transfer and/or send the measured value to a receiver. In particular, the communication circuitry may be configured to transmit, transfer and/or send the measured value to the receiver wirelessly and/or via a wireless network. Further, the field device has a position determination circuitry (also referred to as position determination unit) configured to determine and/or establish a geographic position and/or location of the field device. Furthermore, the field device has a control circuitry (also referred to as control unit or controller) which is configured to determine, as a function of and/or based on a current geographical position and/or location of the field device, a current measurement rate at which the sensor circuitry records measured values of the process variable, and/or to determine a current data transmission rate at which the communication circuitry transmits measured values to the receiver. In particular, the control circuitry can automatically determine the measurement rate and/or the data transmission rate based on the current geographical position of the field device.

The measuring rate can designate here and in the following a frequency and/or number of measurements performed and/or to be performed per time unit. The measurement rate can thus specify how often per unit of time a measured value is acquired and/or measured with the field device. Similarly, the data transmission rate may denote a frequency and/or number of transmissions of a measured value to the receiver per unit time. The data transmission rate can thus specify how often per unit of time a measured value is transmitted and/or sent to the receiver with the field device.

The field device according to the invention can be configured to adapt, vary, adjust and/or change the current measurement rate and/or the current data transmission rate according to the current geographical position of the field device, in particular as required. The current geographical position can indicate and/or designate the position and/or location of the field device at which the field device is currently located. By adjusting the measurement rate and/or data transmission rate, it can be advantageously ensured that a measurement is only carried out, a measured value is recorded and/or a measured value is transmitted to the receiver when required. This can, in particular, significantly reduce an energy consumption of the field device for performing measurements and/or for data transmission. This can be particularly advantageous in the case of battery-powered field devices, since, for example, an interwall for replacing the batteries can be increased.

The "setting" of the measuring rate by the control circuitry can mean here and in the following that the control circuitry is configured to determine, establish and/or set the measuring rate based on the current geographical position. Also, the control circuitry may be configured to instruct the sensor circuitry to determine measurement values of the process variable according to the current measurement rate. For this purpose, the control circuitry can, for example, determine and/or set a time for a next determination of a measured value and/or a time interval between two successive measurements (or determinations of measured values) based on the current geographical position.

Analogously, the "setting" of the data transmission rate by the control circuitry may mean here and in the following that the control circuitry is configured to determine, ascertain and/or set the data transmission rate based on the current geographical position. Also, the control circuitry may be configured to instruct the communication circuitry to transmit, send and/or transfer one or more determined measured values to the receiver according to the current data transmission rate. For this purpose, the control circuitry can, for example, determine and/or set a time for a next data transmission of a (next) measured value and/or a time interval between two temporally successive data transmissions, such as two temporally successively measured values, based on the current geographical position.

For example, the measurement rate can correlate and/or correspond with the data transmission rate. A time for a next determination of a measured value can therefore correlate and/or correspond with a time of a next data transmission and/or a next transmission of the measured value to the receiver. However, the measurement rate and the data transmission rate can also be determined, adjusted, set and/or fixed independently of each other by the control circuitry.

The sensor circuitry may generally denote a sensor system and/or a sensor circuit that is configured to determine one or more, arbitrary process variables, such as, for example, to determine a filling level of a medium in a container and/or tank, a filling level of a product on a stockpile, a temperature of a medium (such as in a container and/or tank), a pressure of a medium (such as in a container and/or tank), and/or a flow rate of a medium. Also, the process variable may denote an analysis parameter of a medium, such as a color of a medium, a degree of foaming of a medium, a density of a medium, a pH of a medium, and/or any other analysis parameter.

According to an embodiment, the field device may be a level meter, a radar-based level meter, a temperature meter, a pressure meter, and/or a flow meter. The field device may alternatively or in addition be configured to determine an analysis parameter, for example, a color of a medium, a degree of foaming of a medium, a density of a medium, a pH of a medium, and/or any other analysis parameter.

The receiver may in principle be any type of receiver. In the context of the present disclosure, the receiver may, for example, denote a system superordinate to the field device and/or a receiving device that can receive and/or collect data from the field device, in particular measured values. For example, the receiver may be an operating device, a smartphone, a laptop, a PC, a computer, a tablet, a control center, a controller, a data management system, a database, a server, and/or a visualization system in which data from one or more field devices may be collected.

Any communication standards for short-range communication and/or long-range communication can be used for communication of the field device with the receiver. In particular, the communication circuitry can be configured for wireless communication with the receiver. For example, the communication circuitry may have a WLAN (Wireless Local Area Network), a GPRS (General Packet Radio Service), a cellular, an LTE (Long Term Evolution), a 3G, a 4G, a 5G or future standards, an NBIoT, Zigbee, Sigfox an LPWAN, a LoRa, a Bluetooth, a Bluetooth LE, a radio and/or an infrared module. Also, the communication circuitry may have several such communication modules to transmit data, in particular measured values, to the receiver (or several receivers) via different communication standards. Alternatively or in addition, the communication circuitry may also be configured for wired communication with the receiver. For example, the communication circuitry may have an Ethernet module and/or a LAN (local area network) module. Also, the communication circuitry may communicate with the receiver via a field bus, such as a HART bus, a Profibus, a Foundation Fieldbus bus, a Modbus, an SDI-12 bus, an EthernetIP bus, a Profinet bus, an IP based bus, an Ethernet IP bus, a serial bus, and/or a parallel bus. Other communication connections, e.g. via IO-Link, a 4 . . . 20 mA/HART interface and/or a USB connection, are also conceivable.

The invention may be considered to be based in particular on the findings described below. Field devices of process and/or factory automation with (e.g. wireless) communication circuitry and/or radio interface are increasingly used in many fields of industry. As a rule, the field devices are configured for, installed in and/or attached to a specific application. In some cases, the application with the installed field device(s) is in motion. One such application is, for example, the level measurement of a medium on and/or in a mobile, movable and/or non-stationary container and/or tank. Field devices with wireless communication interface transmit data wirelessly to receivers and/or higher-level systems, such as controllers (PLC, DCS, SCADA system or the like), servers and/or visualization systems, which may optionally be cloud-based. Such receivers and/or systems can, for example, centrally collect data from field devices, which can be transmitted line-based (e.g., via Ethernet, Profibus, Foundation Fieldbus, Modbus, EthernetIP, Profinet, HART or the like) and/or also wirelessly (e.g., via Bluetooth, WLAN, LoRa, GSM, GPRS, UMTS, LTE, 5G or future standards or the like). With line-based communication, data can be accessed locally and/or networked via the Internet. In the case of wireless communication, radio systems can be used that can transmit data wirelessly, in particular over long distances, to said receivers and/or systems. In accordance with the present disclosure, it may be provided to determine, set and/or adjust the measurement rate of the field device depending on the position and/or location of the field device, in particular for mobile and/or movable applications. For example, for field devices in mobile applications, there may be areas and/or zones of a manufacturing, production and/or industrial plant (e.g., in the chemical, food, pharmaceutical, petroleum, paper, cement, shipping or mining sectors) that differ with respect to a dynamic and/or an activity. A different dynamic and/or activity of such a zone may be accompanied by a different rate of change of the process variable, i.e., a different change of the process variable per unit time. For example, a manufacturing, production and/or industrial plant may have a storage zone in which, for example, a medium is stored in containers and/or tanks, and a production zone in which the medium is processed. An activity and/or dynamics may be substantially higher in the manufacturing zone than in the storage zone. Accordingly, a rate of change of the process variable may be higher in the manufacturing zone than in the storage zone. It may therefore be advantageous to increase the measurement rate and/or data transfer rate when the field device is in the manufacturing zone, and to decrease the measurement rate and/or data transfer rate accordingly when the field device is in the storage zone. This can ensure that the measurement rate and/or data transmission rate can be adjusted as needed. On the one hand, this can increase an efficiency of a manufacturing process, since more measured values are determined and/or transmitted via the communication circuitry in a zone in which the process variable can change in short time intervals or in which more measured values per time unit are advantageous. On the other hand, it can be avoided that measured values are determined and/or transmitted too frequently in a zone in which the process variable hardly changes or does not change at all. This in turn can result in energy savings and/or reduce a volume of data to be transmitted. Radio exposure and radio coexistence in the radio room can also be improved.

This can be particularly advantageous for mobile applications or applications, such as mobile field devices on mobile containers and/or tanks, since here the field devices are often supplied by a self-sufficient power supply, such as a battery, accumulator and/or solar supply and/or by energy harvesting. By adapting the measurement rate and/or the data transmission rate as required, it is also possible to dispense with a wired power supply for a field device, which can be advantageous in particular for mobile applications, where a wired power supply can sometimes be difficult to implement. Such mobile applications can be located, for example, inside a factory building (e.g. a hall area and/or production area) and/or in outdoor facilities. By adapting the measurement rate and/or data transmission rate of the field device according to the invention, measured values and information from the field device can thus be transmitted to the receiver in an adequate quantity and at the right time, depending on the position. The measured values can therefore be determined and/or transmitted in a reasonable quantity and/or at position-dependent time intervals. This can lead to energy savings, since energy can always be used at the right time in adequate quantity. A quantity of data to be transmitted can also be reduced in an advantageous manner.

The determination, adjustment and/or setting of the measurement rate and/or the data transmission rate by the control circuitry of the field device depending on the current position and/or location can be automated according to the present disclosure. In other words, the measurement rate and/or the data transmission rate may be set in an automated manner. Thus, manual adjustment at the field device may be unnecessary. In addition, the advantages summarized below may result. The measured values can be sent at the right time in the right amount, depending on the position, and battery and/or accumulator runtimes of the field device can be extended, for example because energy can be saved during times when the measurement rate is low and/or the data transmission rate is low. Also, unnecessary data transmission can be avoided. For example, multiple determination and/or transmission of the same measured value can be avoided, such as when the process variable has not changed over a period of time. Also, a coexistence of radio systems can be improved, for example because the possibly restricted radio space is not constantly used and loaded with full load. Container management or tank management can also be improved, especially in applications with mobile containers, for example because information such as position, full message, empty message, storage or the like can be available in an optimized manner. Also, for example, a filling quantity and number of filling actions can be determined for a tank, a replacement of the tanks can be better scheduled, media in the tanks can be detected in a more demand-oriented manner, and the position determination of the field devices can be made usable locally but also worldwide. It can also optimize automated reordering in highly automated systems. In addition, the field device can be installed, for example in the initial installation, in a "secured area", such as mounted on a container, and the field device can then be moved with the container, whereby the measurement rate and/or data transmission rate can be automatically adjusted depending on the position. It is also possible, for example, to improve and/or optimize a distinction between empty and full containers, for example with regard to logistical processes (e.g. collection of empty tanks or triggering an order for new tanks or contents), which is virtually synonymous with cost optimization. Also a stock determination, a setup phase detection, a production area detection or the like can be simplified. In addition, an optimized positioning and/or sorting of containers (e.g., according to full containers, partially filled containers, and/or empty containers), for example on a factory site, can be improved and/or optimized. Further, production can be better monitored, controlled, verified, and/or ensured by up-to-date data from the field device or devices. In other words, automation processes can also be optimized in mobile applications through the position-dependent adjustment of the measurement rate and/or data transmission rate. By transferring the position or position-dependent metered data, measured values and/or other information from the field device with communication interface to the receiver, logistics can be optimized plant-wide, for example. This can lead to a reduction in costs by avoiding plant downtimes (e.g. due to a lack of material/medium), to an optimization of delivery processes (from the order to the journey with handover) and to preventive, predictive maintenance of the field devices, for example by receiving data and/or diagnostic information at the right time, and thus to improved planning of service calls.

According to an embodiment, the field device is a mobile field device that is configured to be attached to a mobile container for determining the process variable. The field device and/or container may be movable, transportable, and/or non-stationary. The field device mounted and/or attached to the container may, for example, undergo production of a product together with the container, wherein a medium for producing the product may be stored in the container. The field device may be configured to determine measured values of the medium in the container, such as a level of the medium. In particular, the field device may be configured for self-sufficient, wireless and/or non-wired operation.

According to an embodiment, the position determination circuitry has a position sensor for determining the current geographical position of the field device. The position sensor can be satellite-based, for example, the position sensor can be designed as a GPS sensor. This can be particularly advantageous in outdoor applications of the field device and/or enable reliable position determination.

According to an embodiment, the control circuitry is configured to determine the current geographical position of the field device based on position data received via the communication circuitry. Alternatively or additionally, the position determination circuitry is at least partially integrated in the control circuitry. In other words, the position determination circuitry may be part of the control circuitry. For example, the position data may be obtained from the communication network itself, such as via a dial-up node, a radio cell, and/or by providing geo-information via the communication network. Also, the position data may be provided by any receiver and/or communication partner, such as a gateway, one or more radio cells, one or more beacons, one or more radio transmitters, a server, a control circuitry, another field device, or the like.

For example, the communication circuitry can have a Bluetooth(-LE) module. Particularly in the interior of e.g. factory halls, production halls or the like, the position of the field device can be determined by means of Bluetooth and locally mounted beacons and/or radio cells, for example. The control circuitry can, for example, determine the position of the field device by means of trilateration based on signals from three or more beacons and/or radio cells. Alternatively or in addition, field-mounted Bluetooth gateways, such as IoT gateways, may be used to determine position via the communication circuitry. However, any other type of communication link can be used for position determination.

According to an embodiment, the control circuitry is configured to determine and/or set the current measurement rate and/or the current data transmission rate based on a remote interrogation, for example, by transmitting the current geographic position of the field device to a receiver. For example, the field device may transmit its current geographic position to the receiver, and the receiver may in turn transmit the current measurement rate and/or data transmission rate to the field device. The field device may therefore be configured to receive and/or interrogate the current measurement rate and/or data transmission rate from the receiver. Remote interrogation in this case can comprise near-distance communication and/or long-distance communication between the field device and the receiver.

According to an embodiment, the field device further comprises a data store (also referred to as data memory or memory) configured to store position data for one or more zones, each of the zones being representative of a temporal change and/or rate of change of the process variable expected in the respective zone. Each zone is thereby assigned a measurement rate and/or a data transmission rate, wherein the control circuitry is configured to determine and/or set the current measurement rate and/or the current data transmission rate based on a comparison of the current geographic position and the position data stored in the data store. The zones may be, for example, areas of a production and/or manufacturing plant. At least some of the zones and/or areas may differ with respect to a dynamic, an activity and/or a (e.g. expected) rate of change of the process variable. Such differences in the dynamics, activity and/or rate of change of the process variable may be taken into account by the measurement rate and/or the data transmission rate assigned to the respective zones. Thus, the measurement rate and/or data transfer rate assigned to a zone may be representative and/or indicative of the dynamics and/or activity of the respective zone. Similarly, the measurement rate and/or data transmission rate associated with a zone may be representative and/or indicative of the (e.g., expected) rate of change of the process variable in that zone. The position data of the zones and the measurement rates and/or data transfer rates assigned to them can be stored in the data store, for example in the form of a look-up table.

The position data of the zones as well as the measurement rates and/or data transmission rates assigned to them can be set and/or defined by a user, for example. Also, this data can be retrieved via the communication circuitry of the field device, for example from a server, another field device, an operating device or any other communication partner. The field device can also be configured to transmit the position data of the zones and the measurement rates and/or data transmission rates assigned to them to other field devices.

The position data of the individual zones can also be determined, for example, by walking the boundaries of the zones with the field device and storing the position data during the walk. This can significantly simplify programming and/or storing the position data of the zones in the field device.

According to an embodiment, the control circuitry is configured to determine a transmission rate for transmitting a diagnostic value and/or for transmitting status information of the field device to a receiver depending on the current geographical position. In other words, a transmission and/or transmission rate of diagnostic values and/or status information can also be adjusted and/or performed depending on the position. Analogous to the data transmission rate for measured values, the transmission rate of the diagnostic value and/or status information may specify a frequency and/or number of transmissions of a diagnostic value and/or status information to the receiver per unit time. The transmission rate can thus specify how often per unit of time a diagnostic value and/or status information is transmitted and/or sent to the receiver with the field device.

According to an embodiment, the control circuitry is configured to detect a position change and/or a movement of the field device. Furthermore, the control circuitry is configured to initiate a system start of the field device, to determine (set and/or define) the current measurement rate, to determine (set and/or define) the current data transmission rate and/or to initiate a system stop of the field device in response to a detection of the position change and/or the movement of the field device. A movement and/or position change of the field device may thus initiate an adjustment of the measurement rate and/or the data transmission rate. A system start may here comprise an activation of a power supply of the sensor circuitry, the position determination circuitry and/or further components. Similarly, a system stop can comprise a deactivation of a power supply of the sensor circuitry, the position determination circuitry and/or further components. Alternatively or in addition, the measurement rate and/or the data transmission rate may be varied as desired. For example, to prevent measurement and/or data transmission, the measurement rate and/or the data transmission rate may be set to zero. To perform measurements and/or data transmissions at regular time intervals, the measurement rate and/or the data transmission rate can be set to a non-zero value, such as a value associated with the current position of the field device.

According to an embodiment, the field device comprises a motion sensor, wherein the control circuitry is configured to detect a position change and/or a movement of the field device based on a motion signal of the motion sensor of the field device. For example, the motion sensor may be a Doppler sensor, an acceleration sensor, a gyro sensor, a vibration sensor, and/or a geomagnetic field sensor. This can enable reliable and fast determination of the change in position and/or motion.

According to an embodiment, the control circuitry is configured to determine a first geographic position of the field device at a first time and a second geographic position at a second time that is different from the first time, wherein the control circuitry is configured to detect a position change and/or a movement of the field device based on a comparison of the first position and the second position. In other words, the position change and/or the movement can also be determined based on positions of the field device determined at different times.

According to an embodiment, the field device further comprises a housing that completely and/or permanently encloses the sensor circuitry, the control circuitry, the position determination circuitry and the communication circuitry. In particular, the sensor housing may be configured such that it cannot be opened. For example, the housing may be completely closed, dust-tight, water-tight and/or air-tight. This allows the field device to be used on site as a compact device in the field or in the plant.

According to an embodiment, the field device is completely wireless to the outside. Alternatively or additionally, the housing has no cable feed-through. This means that the field device can be operated completely autonomously and without cables, at least temporarily. This also enables efficient and flexible attachment of the field device to any, for example transportable, container and/or tank. It can also significantly reduce the installation effort required to install the field device. For example, the field device can be screwed, glued and/or welded to the container and/or tank.

According to an embodiment, the field device further comprises a power supply circuitry (also referred to as power supply unit or power supply), which is arranged in a housing of the field device and which is configured to supply the sensor circuitry, the control circuitry, the position determination circuitry and the communication circuitry with electrical power. For this purpose, the power supply circuitry may comprise at least one battery and/or at least one accumulator. Also, the power supply circuitry may comprise a charging circuitry for charging the accumulator, for example via induction, an energy harvesting and/or a solar panel.

According to an embodiment, the field device is configured to transmit and/or send the current measurement rate and/or the current data transmission rate to another field device via the communication circuitry. For example, the field device can transmit and/or send the measurement rate and/or the data transmission rate to one or more further field devices in the vicinity of the field device. In this way, an entire production plant can be optimized in a simple and reliable manner.

Another aspect of the present disclosure relates to a method of operating a field device as described above and below. The method comprises the following steps:

Determining and/or determining, with the position determination circuitry, a current geographic position of the field device; and Determining, adjusting, varying, setting, and/or changing, with the control circuitry, a current measurement rate and/or a current data transmission rate depending on the determined current geographic position of the field device.

Features, elements and/or functions of the field device as described above and below may be features, elements and/or steps of the method as described above and below, and vice versa.

In the following, embodiments of the invention are described with reference to the figures.

Similar, similar-appearing, identical or identical-appearing elements are given similar or identical reference signs in the figures. The figures are merely schematic and not to scale.

DETAILED DESCRIPTION OF EXEMPLARY EMBODIMENTS

Figure 1A:
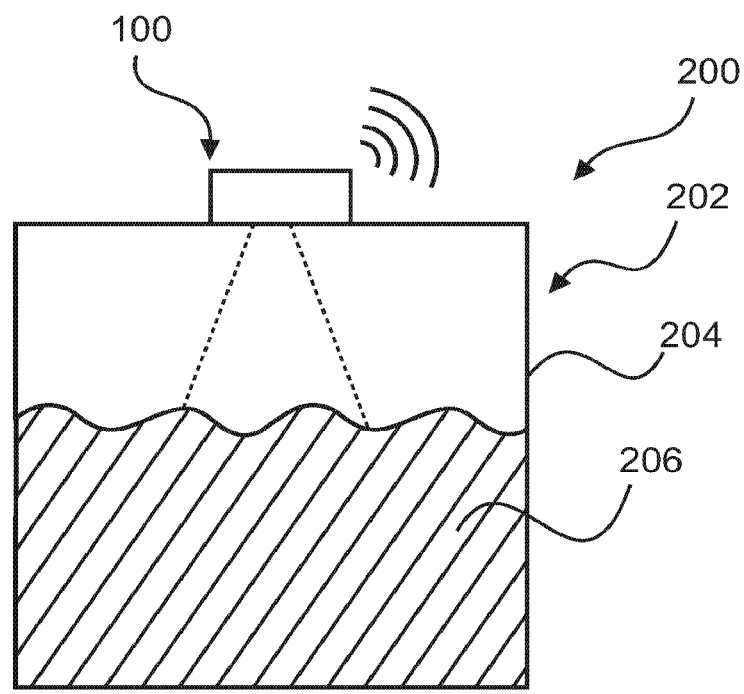
FIG. 1A schematically shows a sensor arrangement with a field device according to an embodiment.
Figure 1B:
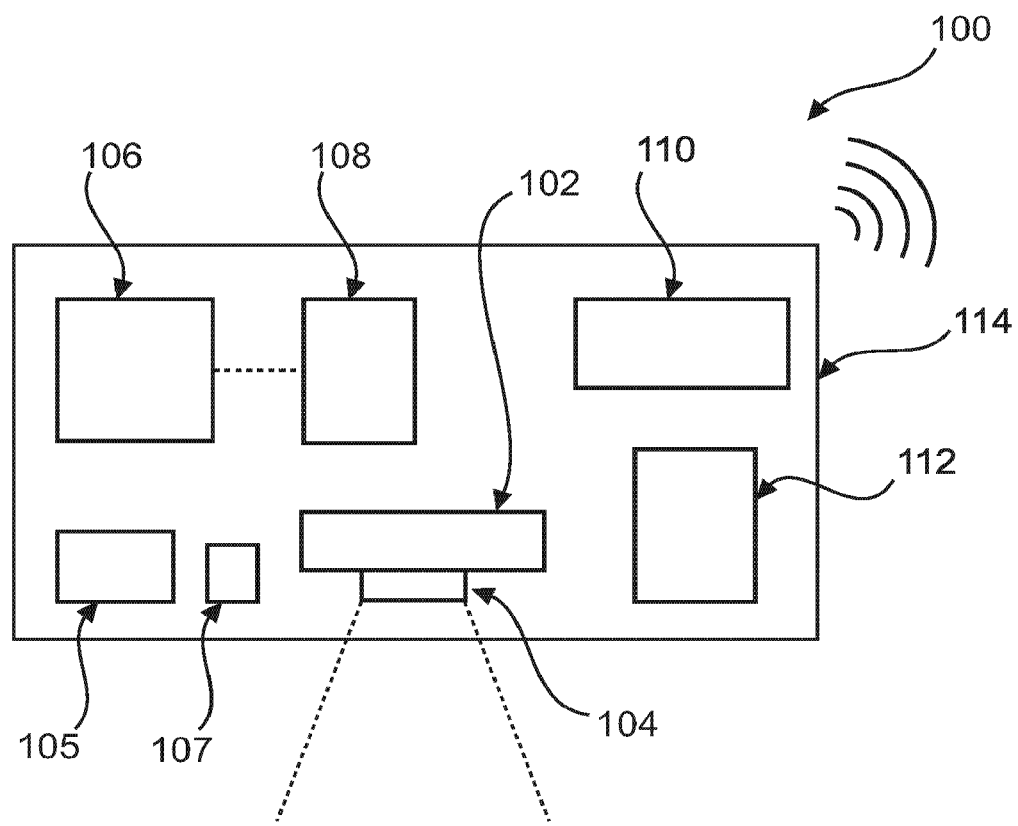
FIG. 1B shows a detailed view of the field device of FIG. 1A.

FIG. 1A schematically shows a sensor arrangement 200 with a field device 100 according to an embodiment. FIG. 1B shows a detailed view of the field device 100 of FIG. 1A.

Exemplarily, the field device 100 of FIGS. 1A and 1B is designed as a radar-based level measuring device 100. Alternatively or additionally, however, the field device 100 can also be designed as an ultrasound-based level measuring device, as a temperature measuring device, as a pressure measuring device, as a flow measuring device and/or as a measuring device for detecting any other process variable.

The sensor arrangement 200 comprises the field device 100 and a container 202 and/or tank 202. The container 202 is at least partially filled with a medium 206 and has a container wall 204, and the field device 100 is attached to the outside of the container wall 204 of the container 202. For example, the field device 100 may be bonded, welded, and/or attached to the container 202 by means of a mechanical connection, such as a threaded connection.

The container 202 and/or the field device 100 are mobile, movable, and/or transportable. For example, the container 202 may be an intermediate bulk container (IBC), which may be at least partially made of plastic.

The field device 100 includes a sensor circuitry 102 having an antenna 104 for radiating and/or receiving a measurement signal and/or radar signal. Specifically, a transmit signal may be radiated via the antenna 104 and a portion of the transmit signal reflected from the medium 206 may be received as a receive signal. The sensor circuitry 102 may determine a measurement value for the level of the medium 206, for example, based on a time-of-flight measurement between emitting and receiving the measurement signal.

Further, the field device 100 comprises a control circuitry 106. The control circuitry 106 can be used, for example, to control the sensor circuitry 102 in order to perform a level measurement and/or to determine a (level) measured value.

Further, the field device 100 comprises a position determination circuitry 108 that is configured to determine a current geographic position and/or location of the field device 100. For this purpose, the position determination circuitry 108 may have a position sensor, which may be satellite-based, for example. For example, the position sensor may be a GPS sensor.

Alternatively or in addition, the position determination circuitry 108 may be at least partially integrated into the control circuitry 106 and the current position of the field device 100 may be determined using position data that may be received via a communication circuitry 110 of the field device 100, as described above and below.

Exemplarily shown in FIGS. 1A and 1B, the communication circuitry 110 of the field device 100 is configured to wirelessly transmit data and/or communicate with a receiver. For example, the communication circuitry may have a WLAN (Wireless Local Area Network), a GPRS (General Packet Radio Service), a cellular, an LTE (Long Term Evolution), a 3G, a 4G, a 5G and/or other future wireless communication standards, an NBIoT, a Zigbee, a Sigfox, an LPWAN, a LoRa, a Bluetooth, a Bluetooth LE, a radio and/or an infrared module. Alternatively or in addition, however, the communication circuitry 100 may be configured for wired data transmission and/or communication.

For example, measured values, diagnostic information, and/or status information can be transmitted to the receiver via the communication circuitry 110. Data can also be received from the receiver via the communication circuitry 110, for example parameterization data, diagnostic data, status data, position data and/or any other data.

Further, the field device 100 comprises a power supply circuitry 112 that can supply electrical power to the sensor circuitry 102, the antenna 104, the control circuitry 106, the position determination circuitry 108, the communication circuitry 110, and/or other components. For example, the power supply circuitry 112 may include at least one of a battery and an accumulator. Also, the power supply circuitry 112 may comprise a charging circuitry for charging the accumulator, for example, via power supply, induction, energy harvesting, and/or solar panels.

Furthermore, the field device 100 has a housing 114 that encloses, in particular completely encloses and/or hermetically seals the sensor circuitry 102, the antenna 104, the control circuitry 106, the position determination circuitry 108, the communication circuitry 110, and the power supply circuitry 112, so that the use of the field device under field conditions and/or in the plant is ensured. The housing 114 may be at least partially, in particular completely, made of plastic. Further, the housing 114 may be completely enclosed. Thus, the field device 100 may be designed to be completely wireless to the outside, such that the housing 114 may not include a cable feedthrough.

The position determination circuitry 108 is configured to determine and/or establish the current geographic position and/or location of the field device 100. For example, the current position may be determined based on a sensor signal from a position sensor of the position determination circuitry 108. Alternatively or in addition, the control circuitry 106 may determine the current position of the field device 100 based on position data, data and/or signals received via the communication circuitry 110, for example from one or more radio cells, one or more beacons, one or more gateways (including IOT gateways), one or more servers, one or more field devices, one or more operator devices and/or any other communication partners.

For example, the communication circuitry 110 may include a Bluetooth(-LE) module and may be coupled to one or more radio cells and/or beacons that are within range of the communication circuitry 110. For example, using trilateration, the control circuitry 106 may determine the current geographic position of the field device 100 based on position data, data and/or signals from a plurality of radio cells and/or beacons. Position data representing the current position of the field device 100 may also be received, for example, via a dial-up node to which the communication circuitry 110 may be coupled. Also, the position data may be provided by any receiver and/or communication partner, such as one or more gateways, one or more radio transmitters, a server, an operator device, another field device, or the like.

The control circuitry 106 is further configured to determine, adjust, change, vary, and/or set a measurement rate at which the sensor circuitry 102 acquires measurement values based on the current geographic position. Alternatively or in addition, the control circuitry 106 is configured to determine, adjust, set, change, vary, and/or define, based on the current geographic position, a data transmission rate at which measurement values are sent to a receiver via the communication circuitry 110.

Optionally, a transmission rate for transmitting a diagnostic value and/or status information of the field device 100 based on the current geographic location may also be determined, adjusted, set, changed, varied, and/or fixed by the control circuitry 106.

A measurement rate for performing measurements, a data transmission rate for transmitting measurement values, a transmission rate for transmitting status information, and/or a transmission rate for transmitting diagnostic values that is appropriate for or associated with the respective current geographic position of the field device 100 may be determined by the field device 100 and/or retrieved by a communication partner, for example, via remote inquiry. For example, the field device 100 may send its current geographic position to a receiver, such as a server, wherein the receiver may send and/or transmit one or more signals to the field device 100 for transmitting the measurement rate for performing measurements, for transmitting the data transmission rate for transmitting measurement values, for transmitting the transmission rate for transmitting status information, and/or for transmitting the transmission rate for transmitting diagnostic values.

Alternatively or in addition, the field device 100 can have a data store 105 in which position data for one or more positions, zones and/or areas, for example of a production and/or manufacturing plant, can be stored. The position data for the positions, zones and/or areas may in turn each be associated with a measurement rate, a data transmission rate, a transmission rate for status information and/or a transmission rate for diagnostic values, and may be stored in the data store 105. Based on the current geographic position of the field device 100, the control circuitry 106 may determine the position data that is closest to the current position of the field device 100 to determine, set, and/or adjust the measurement rate, the data transmission rate, the transmission rate for status information, and/or the transmission rate for diagnostic values.

A (re)setting and/or determination of a measurement rate, a data transmission rate, a transmission rate for status information, and/or a transmission rate for diagnostic values may be performed, triggered, and/or initiated by the control circuitry 106 when the control circuitry 106 detects that a position change and/or a movement of the field device 100 has occurred. In this regard, the change in position and/or movement may be determined based on, for example, a plurality of positions of the field device 100 that are determined sequentially in time. Alternatively or in addition, the position change and/or movement of the field device 100 may be determined based on a movement signal from a movement sensor 107 of the field device 100. For example, the motion sensor 107 may be a Doppler sensor, an accelerometer, a gyro sensor, a vibration sensor, and/or a geomagnetic field sensor.

Figure 2:
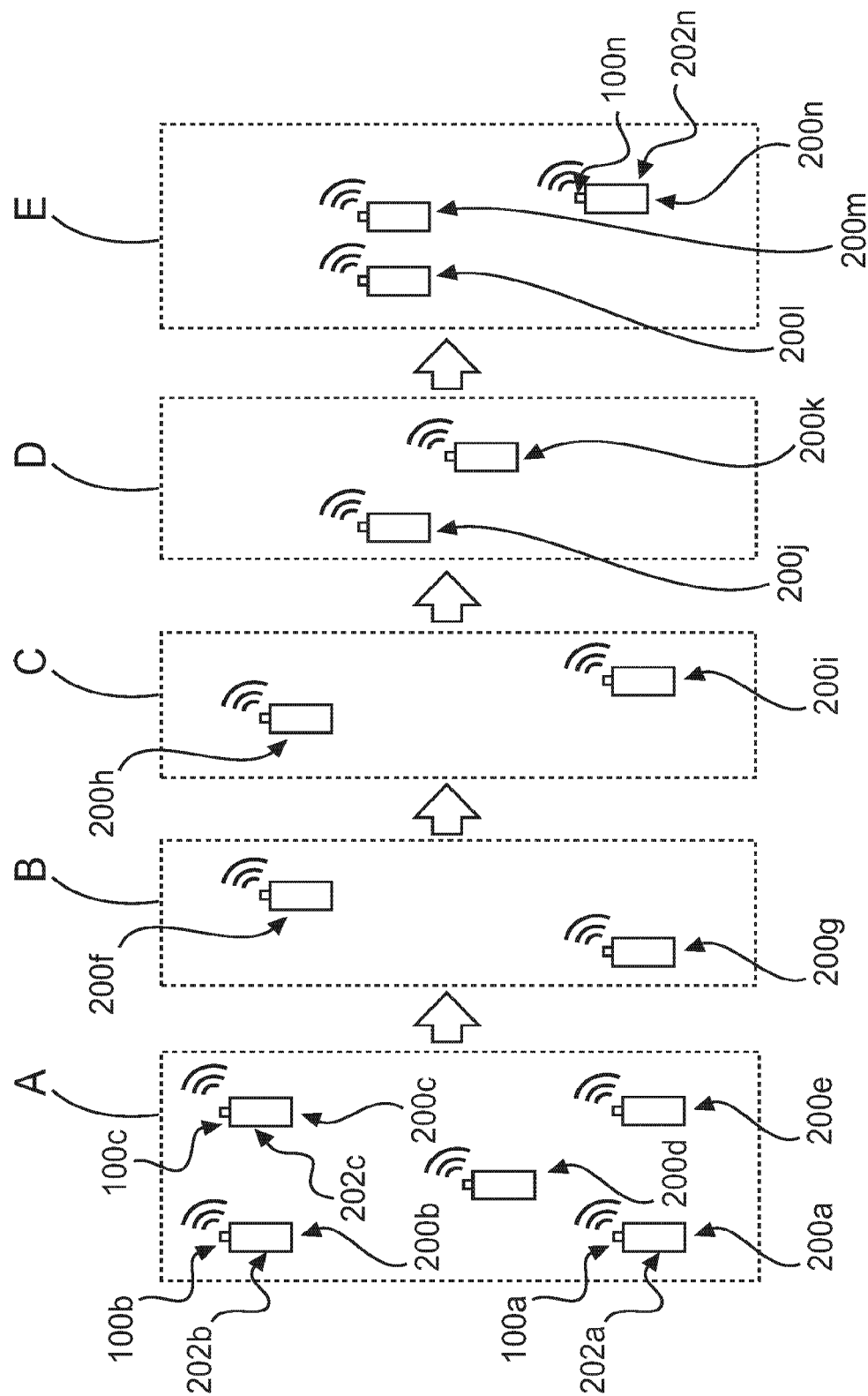
FIG. 2 schematically shows a manufacturing process with several sensor arrangements according to an embodiment example.

FIG. 2 schematically illustrates a logistics and/or manufacturing process with multiple sensor arrangements 200a-200n according to an embodiment. Unless otherwise described, each of the sensor arrangements 200a-200n of FIG. 2 has the same elements and features as the sensor arrangement 200 of FIGS. 1A and 1B.

More specifically, FIG. 2 schematically illustrates a typical logistics and/or manufacturing process of a production and/or manufacturing facility. Each of the sensor arrangements 200a-200n has a mobile container 202a-202n (for example, an IBC container) to which a mobile field device 100a-100n is attached. For clarity, only the sensor assemblies 200a-200n are sporadically referenced in FIG. 2. Each of the field devices 100a-100n can be designed as a radar-based level measuring device 100a-100n. Alternatively, however, the field devices 100a-100n may be configured to measure another process variable. For example, some or all of the field devices 100a-100n may be configured as ultrasonic-based level measurement devices, temperature measurement devices, pressure measurement devices, flow measurement devices, and/or measurement devices for sensing any other process variable.

Exemplary mobile applications with field devices 100a-100n are thus shown in FIG. 2, each of which is equipped with a wireless communication circuitry 110 and which are exemplarily designed as level measuring devices 100a-100n and are attached to mobile containers 202a-202n (for example here an IBC container).

In FIG. 2, the sensor arrangements 200a-200n run through an exemplary production process at a production facility, or the sensor arrangements 200a-200n are each located in a specific area and/or a specific zone of a production facility. The production plant exemplarily has the zones and/or areas A-E. Zones A and E may each be, for example, a storage zone (and/or a station for containers and/or tanks). Zones B and D may each denote transportation zones within the manufacturing facility. Zone C may denote a manufacturing zone. Individual ones of these zones A-E can differ thereby regarding a dynamic and/or activity of the manufacturing process taking place there. Consequently, the rates of change of the process variable, i.e. in the example of FIG. 2 of the filling level of media in the containers, may differ in at least some of the zones and/or areas A-E. In other words, the level in the individual containers 202a-202n may change at different rates per unit time in the respective zones A-E. Individual ones of the mobile containers 202a-202n may be used in the production system for storing and/or transporting various substances and/or media, and such containers 202a-20n may be emptied or also filled at different locations in the production system. The individual zones A-E may thus correspond to production areas A-E of the manufacturing plant.

For example, sensor arrays 200a-200e may be delivered to zone A with mobile containers 202a-202e and field devices 100a-100e attached thereto. A low to no measurement rate may be required for zone A and/or the field devices 100a-100e located therein, since the fill level of the individual containers 202a-202e in zone A changes little to not at all, for example because the sensor arrangements 200a-200e of zone A are not involved in the actual production process or because no filling or emptying takes place in the zone. The field devices 100a-100e are each configured to determine their current geographic position. Based on this, the field devices 100a-100e may determine, for example, that they are in zone A and thus determine the measurement rate (low to none) associated with zone A so that energy is not unnecessarily consumed for level measurements. Also, the field devices 100a-100e may appropriately set the data transmission rate for transmitting measured values, the transmission rate for transmitting status information, and/or the transmission rate for transmitting diagnostic values, as explained above.

When containers are moved from zone A toward the manufacturing process, they pass through the transport zone, called zone B in FIG. 2. In the example of FIG. 2, the sensor arrangements 200f, 200g with containers 202f, 202g and field devices 100f, 100g are located in Zone B. For these field devices 100f, 100g, for example triggered by the detected new position, the position change and/or the movement, a system start can occur and/or the measurement rate can be increased, for example compared to Zone A. The measurement rate of the field devices 100f, 100g can be increased. For example, the measurement rate of the field devices 100f, 100g in zone B may be a multiple of the measurement rate of the field devices 100a-100e in zone A. The same may apply to the data transmission rate and/or the transmission rate for status information and/or diagnostic values.

As the containers are transported further in the direction of the manufacturing process, they enter the manufacturing zone, which in the example of FIG. 2 is designated as Zone C. In FIG. 2, the sensor arrangements 200h, 200i with containers 202h, 202i and field devices 100h, 100i are located in zone C. The field devices 100h, 100i also determine their current geographical position and automatically set the measurement rate and/or the data transmission rate to the values assigned to zone C. The same applies to the transmission rate for status information and/or diagnostic values. The same applies to the transmission rate for status information and/or diagnostic values. Since the highest activity and/or dynamics of the manufacturing process prevail in the manufacturing or production zone, i.e. zone C, for example due to filling and/or emptying of the containers 202h, 202i, a higher or the highest measurement rate and/or a higher or the highest data transmission rate is set here automatically by the field devices 100h, 100i.

After the manufacturing process has been completed, the containers again pass through a transport zone, called zone D in the example of FIG. 2. Here, the sensor arrangements 200j, 200k with the mobile containers 202j, 202k and the field devices 100j, 100k are currently located. Analogous to zone B and possibly triggered by the detected new position, the change of position and/or the movement, a system stop or a system reduction and/or a system shutdown process for the field devices 100j, 100k can take place in zone D. Alternatively or in addition, the measurement rate, the data transmission rate and/or the transmission rate for status information or diagnostic values can be reduced as required. Thus, a lower measuring rate can be set in zone D than in zone C, for example because the probability of emptying or filling is low in zone D.

Arriving in zone E, which can be a storage zone (station), the measuring rate can be further reduced, respectively set to zero. In zone E, low to no measuring rates (data transmission rates, transmission rates for status information and/or for diagnostic values) may be required, since the sensor arrangements 200l-200n located there with containers 202l-202n and field devices 100l-100n are not involved in the production process or no filling or emptying takes place. The sensor arrangements 200l-200n of zone E can—analogous to zone A—be in a "standby" operating mode.

Overall, depending on the position of the container, field device and/or sensor arrangement, the optimized measurement rate, data transmission rate, transmission rate for status information and/or transmission rate for diagnostic values suitable for the respective zone A-E can thus be used, defined and/or set.

Figure 3:
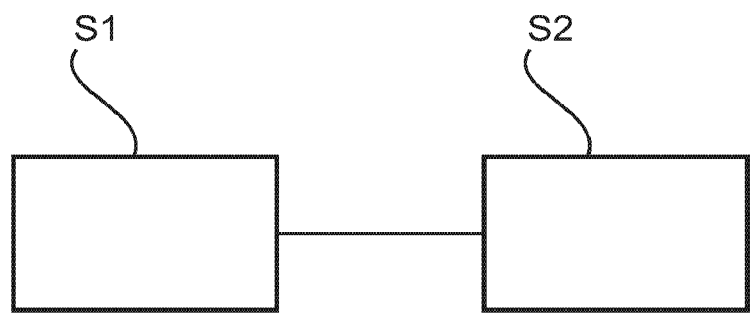
FIG. 3 shows a flowchart illustrating a method for operating a field device according to an embodiment.

FIG. 3 shows a flowchart illustrating steps of a method for operating a field device 100 according to an embodiment. The field device 100 of FIG. 3 may be one of the field devices described with reference to preceding figures.

In a step S1, a current geographic position of the field device 100 is determined using the position determination circuitry 108.

In a further step S2, the control circuitry 106 is used to determine, set and/or set in the field device a current measurement rate and/or a current data transmission rate depending on the determined current geographical position of the field device.

It should be noted in addition that "comprising" and "comprising" do not exclude other elements or steps, and the indefinite articles "one" or "a" do not exclude a plurality.

Furthermore, it should be noted that features or steps that have been described with reference to one of the above embodiments may also be used in combination with other features or steps of other embodiments described above. Reference signs in the claims are not to be regarded as limitations.

The invention claimed is:
1. A field device for determining a process variable, the field device comprising:

a sensor circuitry configured to sense a measured value of the process variable;
a communication circuitry configured to transmit the measured value wirelessly to a receiver;
a position determination circuitry configured to determine a geographic position of the field device; and
a control circuitry configured to determine, as a function of a current geographical position of the field device, at least one of:
(a) a current measurement rate at which the sensor circuitry acquires measured values of the process variable, and
(b) a current data transmission rate at which the communication circuitry transmits measured values to the receiver, wherein the current data transmission rate defines how often per unit of time a measured value is sent to the receiver with the field device,
wherein the control circuitry is further configured to determine and/or to set the current measurement rate and/or the current data transmission rate based on a remote query.

2. The field device according to claim 1, wherein the field device is a level meter, a radar-based level meter, a temperature meter, a pressure meter, and/or a flow meter.

3. The field device according to claim 1, wherein the field device is a mobile field device configured to be attached to a mobile container for determining the process variable.

4. The field device according to claim 1,
further comprising a data store configured to store position data for one or more zones (A-E), each of the one or more zones (A-E) being representative of a rate of change of the process variable expected in a respective zone of the one or more zones (A-E),
wherein, in the data store, said each of the one or more zones (A-E) is assigned a measurement rate and/or a data transmission rate, and
wherein the control circuitry is further configured to determine and/or to set the current measurement rate and/or the current data transmission rate based on a comparison of a current geographical position and the position data stored in the data store.

5. The field device according to claim 1, wherein the control circuitry is further configured to determine a transmission rate for transmitting a diagnostic value and/or for transmitting status information of the field device to a receiver depending on a current geographical position.

6. The field device according to claim 1, wherein the control circuitry is further configured to:
detect a change in position and/or movement of the field device, and
in response to a detection of the position change and/or a movement of the field device, at least one of initiate a system start of the field device, determine a current measurement rate, determine a current data transfer rate, initiate a system stop, initiate a system shutdown, and initiate a system reduction of the field device.

7. The field device according to claim 1,
further comprising a motion sensor,
wherein the control circuitry is further configured to detect a change in position and/or a movement of the field device based on a movement signal of the movement sensor of the field device.

8. The field device according to claim 1, wherein the control circuitry is further configured to:
determine a first geographic position of the field device at a first time point and a second geographic position at a second time point different from the first time point, and
detect a change in position and/or a movement of the field device based on a comparison of the first geographic position and the second geographic position.

9. The field device according to claim 1,
wherein the control circuitry is further configured to determine a current geographical position of the field device based on position data received via the communication circuitry, and/or
wherein the position determination circuitry is at least partially integrated in the control circuitry.

10. The field device according to claim 1, further comprising a housing that completely and/or permanently encloses the sensor circuitry, the control circuitry, the position determination circuitry, and the communication circuitry.

11. The field device according to claim 1, wherein the field device is configured completely wireless to an outside thereof.

12. The field device according to claim 1, further comprising a power supply circuitry arranged in a housing of the field device and which is configured to supply the sensor circuitry, the control circuitry, the position determination circuitry, and the communication circuitry with electrical power.

13. The field device according to claim 1, wherein the field device is configured to transmit a current measurement rate and/or a current data transmission rate to another field device via the communication circuitry.

14. A method of operating a field device according to claim 1, the method comprising the steps of:
determining, with the position determination circuitry, a current geographic position of the field device; and
determining, with the control circuitry, a current measurement rate and/or a current data transmission rate as a function of the determined current geographic position of the field device.

* * * * *